(12) United States Patent
Lee et al.

(10) Patent No.: US 12,023,997 B2
(45) Date of Patent: Jul. 2, 2024

(54) WINDOW FILM FOR VEHICLES INCLUDING GRAPHENE

(71) Applicant: STEK CO., LTD., Seoul (KR)

(72) Inventors: Changsuk Lee, Seoul (KR); Inhwan Oh, Seongnam-si (KR)

(73) Assignee: STEK CO., LTD., Seoul (KR)

( * ) Notice: Subject to any disclaimer, the term of this patent is extended or adjusted under 35 U.S.C. 154(b) by 511 days.

(21) Appl. No.: 17/494,333

(22) Filed: Oct. 5, 2021

(65) Prior Publication Data

US 2023/0108836 A1   Apr. 6, 2023

(51) Int. Cl.
| | |
|---|---|
| *B60J 3/00* | (2006.01) |
| *B32B 7/12* | (2006.01) |
| *B32B 27/36* | (2006.01) |
| *B60J 1/00* | (2006.01) |
| *C09J 133/08* | (2006.01) |
| *C09J 175/04* | (2006.01) |
| *C08K 3/04* | (2006.01) |
| *C08K 3/22* | (2006.01) |

(52) U.S. Cl.
CPC ............ *B60J 3/007* (2013.01); *B32B 7/12* (2013.01); *B32B 27/36* (2013.01); *B60J 1/001* (2013.01); *C09J 133/08* (2013.01); *C09J 175/04* (2013.01); *B32B 2307/42* (2013.01); *B32B 2605/006* (2013.01); *C08K 3/042* (2017.05); *C08K 3/22* (2013.01); *C08K 2003/2258* (2013.01)

(58) Field of Classification Search
CPC .. B60J 3/007; B60J 1/001; B32B 7/12; B32B 27/36; B32B 2307/42; B32B 2605/006; C09J 133/08; C09J 175/04; C08K 3/042; C08K 3/22; C08K 2003/2258
USPC ........................................................ 359/238
See application file for complete search history.

(56) References Cited

FOREIGN PATENT DOCUMENTS

KR         20140122104 A   * 10/2014

* cited by examiner

*Primary Examiner* — William Choi

(57) ABSTRACT

The present invention relates to a graphene-containing window film for a vehicle, and more particularly, to a graphene-containing vehicle window film attached to a car glass to block heat from entering an interior, and dissipate the heat quickly through graphene, thereby increasing thermal insulation efficiency.

10 Claims, 7 Drawing Sheets

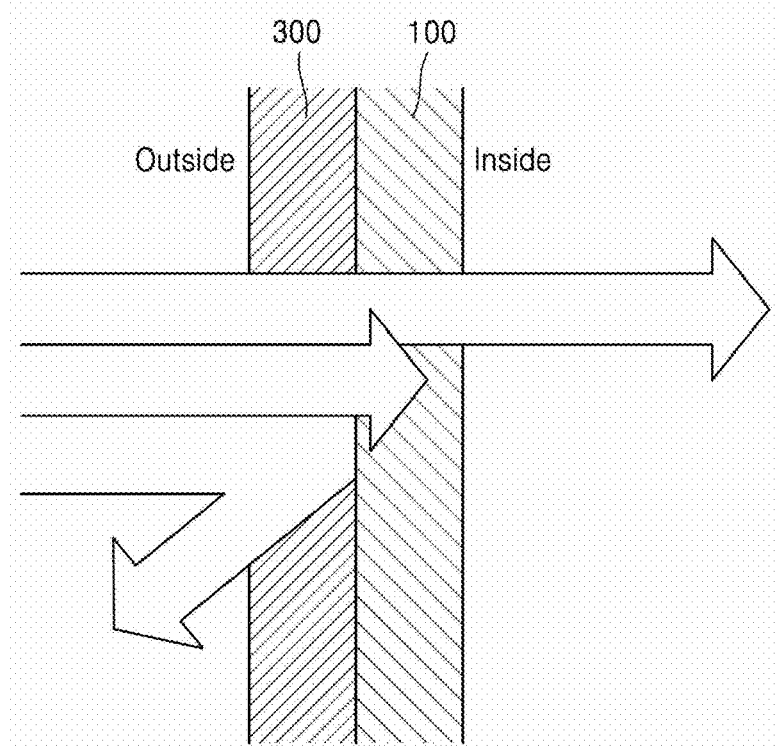

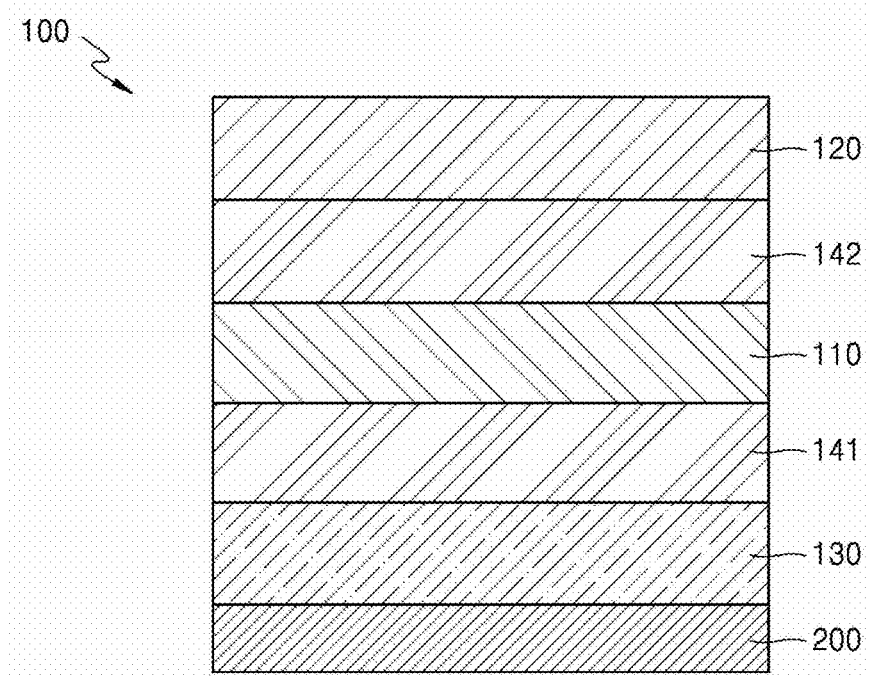

WINDOW FILM FOR VEHICLES INCLUDING GRAPHENE

BACKGROUND OF THE INVENTION

1. Field of the Invention

The present invention relates to a graphene-containing window film for a vehicle, and more particularly, to a graphene-containing vehicle window film attached to a car glass to block heat from entering an interior, and dissipate the heat quickly through graphene, thereby increasing thermal insulation efficiency.

2. Description of the Related Art

Solar light may be mainly divided into ultraviolet, visible, and infrared rays. This is based on the visible light that is light in the wavelength band (380 to 780 nm) and can be recognized by the human eye, so light in a wavelength of 380 nm or less is classified as ultraviolet rays and light in a wavelength of 780 nm or more is classified as infrared rays. The above sunlight is supplied with energy from the sun and supplies the visible light to enable visual perception.

However, the ultraviolet ray has a risk of causing various diseases such as skin cancer due to strong energy, and the infrared ray is required to be blocked due to the high ability of transferring heat so as to facilitate the thermal insulation effect.

Meanwhile, a glass a vehicle is provided with a window in order to separate an interior space from an exterior space of the vehicle and enable a driver inside the vehicle to obtain visual information from the outside. The glass window transmits visible light to enable the driver inside the vehicle to understand the external situation and drive safely, and separates the interior of the vehicle from the outside to serve to protect and comfortably maintain the space inside the vehicle.

However, since the vehicle window transmits not only visible light but also ultraviolet and infrared rays, the problems, for example, the induction of diseases such as skin cancer and the influx of heat may occur as described above. Accordingly, a window film for protecting the interior of the vehicle from the ultraviolet and infrared rays has been developed and used.

FIG. 1 schematically shows an appearance of a car glass 300 to which the above window film 100 is attached. As shown in FIG. 1, when sunlight is applied from the outside to the car glass 300 to which the window film 100 is attached, the sunlight is partially transmitted, partially absorbed into the window film 100, and partially reflected. The reflected sunlight may not affect the interior, but the transmitted sunlight may directly affect the interior, the sunlight absorbed into the window film 100 may increase the temperature of the window film, and eventually heat is dissipated into the vehicle.

Two approaches may be used to minimize the above impacts of sunlight. FIG. 2A shows a car glass 300 attached with a window film 100 that can reduce the impacts on the interior of the vehicle by increasing the reflectivity. In general, the above window film 100 may have the increased reflectivity on the window film 100 by using metal.

Meanwhile, FIG. 2B shows a car glass 300 attached with a window film 100 capable of increasing absorptivity to reduce sunlight transmitted into the vehicle. The above window film 100 having the increased absorptivity may reduce the sunlight transmitted into the vehicle, but the temperature of the window film 100 may be increased due to the absorbed sunlight. In general, the window film 100 may have the increased absorptivity by adding ceramics such as silicate, metal oxide, or carbide.

However, since the increase reflectivity or absorptivity may increase the reflectivity or absorptivity in the ultraviolet and infrared regions while the high transmittance in the visible light region is maintained, it is required to minimize the impacts of sunlight without obstructing the driver's view inside the vehicle.

When FIG. 2A and FIG. 2B are compared to each other, the amount of transmitted sunlight is similar, but the window film 100 having the increased absorptivity as shown in FIG. 2B initially exhibits a thermal blocking effect similar to that of the window film of FIG. 2A since the temperature of the window film 100 is increased by the absorbed sunlight, however, heat is released into the interior of the vehicle due to the increased temperature as time passes. In addition, since the window film 100 as in FIG. 2A not only reflects sunlight but also blocks and reflects almost all electromagnetic waves, and accordingly interrupts radio waves of a GPS or communication device of the vehicle, thereby deteriorating the performance.

SUMMARY OF THE INVENTION

The present invention provides a graphene-containing vehicle window film attached to a car glass to block heat from entering an interior, and dissipate the heat quickly through graphene, thereby increasing thermal insulation efficiency.

In order to solve the above problem, the present invention provides a vehicle window film including: an adhesive layer including an acrylic copolymer, a curing agent, and a solvent; a first PET layer disposed on the adhesive layer and including polyethylene terephthalate; a bonding layer disposed on the first PET layer and including a urethane resin, a curing agent, a UV blocking agent, an IR blocking agent, and graphene; a second PET layer disposed on the bonding layer and including polyethylene terephthalate; and a hard coating layer disposed on the second PET layer and including an acrylic resin and a photoinitiator, wherein the IR blocking agent includes carbon, tungsten oxide (WO3) and ATO.

According to the present invention, the bonding layer may include 0.1 to 5 parts by weight of a curing agent, 3 to 7 parts by weight of a UV blocking agent dispersion, 25 to 30 parts by weight of an IR blocking agent dispersion, 3 to 7 parts by weight of a graphene dispersion, and 90 to 100 parts by weight of a solvent based on 100 parts by weight of the urethane resin.

According to the present invention, the graphene may be formed as a graphene dispersion dispersed in a dispersion solvent and be mixed with the urethane resin and the solvent, and the urethane resin mixed with the graphene dispersion may be mixed with the curing agent to bond the first PET layer to the second PET layer between the first PET layer and the second PET layer.

According to the present invention, the graphene dispersion may be formed by adding graphene to a dispersion solvent containing sulfuric acid and nitric acid and applying ultrasonic waves for 30 minutes to 3 hours.

According to the present invention, the IR blocking agent may be subject to a primary mixing process with the graphene dispersion while being in the form of an IR blocking agent dispersion dispersed in a dispersion solvent, and the mixed solution of the IR blocking agent dispersion and the graphene dispersion may be subjected to a secondary mixing process with the urethane resin and the solvent, thereby forming a bonding layer.

According to the present invention, in the primarily mixing process, the mixed solution of the IR blocking agent dispersion and the graphene dispersion may be dispersed and mixed by a shear force of a high shear mixer.

According to the present invention, in the secondarily mixing process, the mixed solution of the IR blocking agent dispersion and the graphene dispersion having been subject to the primarily mixing process may be mixed with the urethane resin and the solvent and agitated through a bead mill, thereby being dispersed and mixed.

According to the present invention, the adhesive layer may include 0.1 to 5 parts by weight of a curing agent and 90 to 110 parts by weight of a solvent based on 100 parts by weight of the acrylic copolymer.

According to the present invention, the hard coating layer may include 0.1 to 3 parts by weight of a photoinitiator and 140 to 160 parts by weight of a solvent based on 100 parts by weight of the acrylic resin.

According to the present invention, the adhesive layer may have a thickness of 5 to 15 micrometers, the first PET layer may have a thickness of 10 to 20 micrometers, the bonding layer may have a thickness of 5 to 15 micrometers, the second PET layer may have a thickness of 10 to 30 micrometers, and the hard coating layer may have a thickness of 5 to 10 micrometers.

According to one embodiment of the present invention, the vehicle window film may be provided, so that the high transmittance of visible light can be implemented while sunlight in the ultraviolet and infrared regions can be blocked.

According to one embodiment of the present invention, electromagnetic waves are prevented from being reflected, so that sunlight in the ultraviolet and infrared regions can be blocked without interfering with radio waves of electronic devices such as navigation systems, Hi-passes, and smartphones inside the vehicle.

According to one embodiment of the present invention, a high thermal blocking effect can be exhibited by quickly dissipating heat through graphene.

According to one embodiment of the present invention, the contents of IR blocking agent and graphene may be adjusted, so that a high thermal blocking effect can be exhibited without generating haze in the window film.

According to one embodiment of the present invention, graphene may be acid-treated to form a dispersion, so that the occurrence of haze can be inhibited.

According to one embodiment of the present invention, the bonding layer may be dispersed and mixed by the high shear mixer during forming the bonding layer, so that the occurrence of haze can be inhibited.

According to one embodiment of the present invention, the bonding layer may be dispersed and mixed by agitation through the bead mill during forming the bonding layer, so that the occurrence of haze can be inhibited.

BRIEF DESCRIPTION OF THE DRAWINGS

FIG. 1 is a view schematically illustrating transmission, absorption, and reflection of sunlight in a car glass to which a vehicle window film is attached.

FIG. 3 schematically shows a laminated structure of the vehicle window film according to one embodiment of the present invention.

DETAILED DESCRIPTION OF THE INVENTION

Figure 2A:
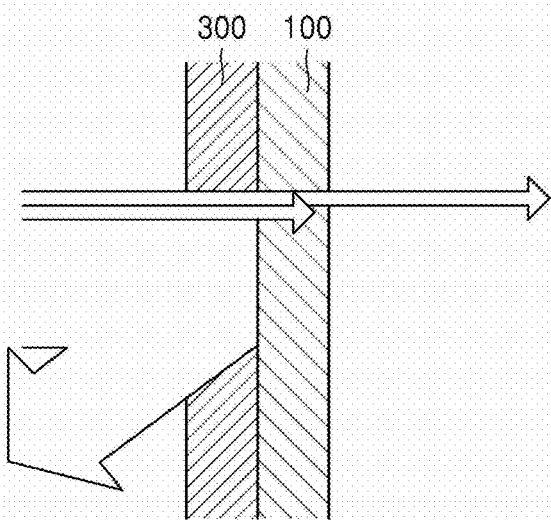
FIGS. 2A and 2B are a view schematically illustrating a method for blocking the transmission of sunlight by using the vehicle window film.
Figure 2B:
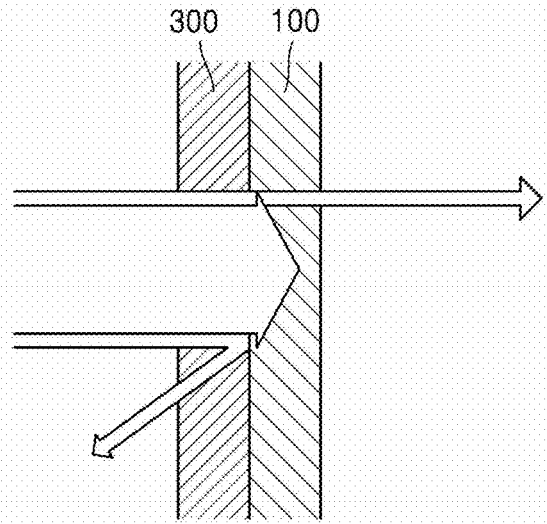

Hereinafter, various embodiments and/or aspects will be described with reference to the drawings. In the following description, numerous specific details are set forth in order to provide a thorough understanding of one or more aspects for the purpose of explanation. However, it will also be appreciated by a person having ordinary skill in the art that such aspect(s) may be carried out without the specific details. The following description and accompanying drawings will be set forth in detail for specific illustrative aspects among one or more aspects. However, the aspects are merely illustrative, some of various ways among principles of the various aspects may be employed, and the descriptions set forth herein are intended to include all the various aspects and equivalents thereof.

The terms "embodiment", "example", "aspect" or the like used herein may not be construed in that an aspect or design set forth herein is preferable or advantageous than other aspects or designs.

In addition, the term "or" is intended to signify an inclusive "or" rather than an exclusive "or". In other words, unless otherwise specified or contextually unclear, the expression "X uses A or B" is intended to signify one of natural inclusive substitutions. In other words, when X uses A; X uses B; or X uses both A and B, the expression "X uses A or B" may be applied to either of the above cases. In addition, it is apparent to be understood that the term "and/or" as used herein refers to and includes all possible combinations of one or more among related items listed.

In addition, the terms "include" and/or "comprise" specify the presence of the corresponding feature and/or element, but do not preclude the possibility of the presence or addition of one or more other features, elements or combinations thereof.

In addition, unless explicitly indicated otherwise in this specification, it will be understood that singular expressions such as "one" include plural expressions. Accordingly, for example, a "component surface" includes one or more component surfaces.

In addition, the terms including an ordinal number such as first and second may be used to describe various elements, however, the elements are not limited by the terms. The terms are used only for the purpose of distinguishing one element from another element. For example, the first element may be referred to as the second element without departing from the scope of the present invention, and similarly, the second element may also be referred to as the first element. The term "and/or" includes any one of a plurality of related listed items or a combination thereof.

In addition, the term used herein is merely for the purpose of illustrating a particular embodiment, and it is not intended to limit the present invention. The singular expression includes a plural expression unless the context clearly means otherwise. In the specification herein, it will be understood that the term such as "include" and "have" is intended to designate the presence of feature, number, step, operation, element, component, or a combination thereof recited in the specification, which does not preclude the possibility of the presence or addition of one or more other features, numbers, steps, operations, elements, components, or combinations thereof.

In addition, in the embodiments of the present invention, unless defined otherwise, all terms used herein including technical or scientific terms have the same meaning as commonly understood by those having ordinary skill in the art. Terms such as those defined in generally used dictionaries will be interpreted to have the meaning consistent with the meaning in the context of the related art, will not be interpreted as an ideal or excessively formal meaning unless expressly defined in the embodiments of the present invention.

In the specification herein, 'carbon' denotes nano-sized graphite particles.

Structure of Vehicle Window Film 100

FIG. 3 schematically shows a laminated structure of the vehicle window film 100 according to one embodiment of the present invention.

The vehicle window film 100 according to one embodiment of the present invention includes: an adhesive layer 130 including an acrylic copolymer, a curing agent, and a solvent; a first PET layer 141 disposed on the adhesive layer 130 and including polyethylene terephthalate; a bonding layer 110 disposed on the first PET layer and including a urethane resin, a curing agent, a UV blocking agent, an IR blocking agent, and graphene; a second PET layer 142 disposed on the bonding layer 110 and including polyethylene terephthalate; and a hard coating layer 120 disposed on the second PET layer 142 and including an acrylic resin and a photoinitiator.

As shown in FIG. 3, the vehicle window film 100 according to one embodiment of the present invention may have a structure formed by the adhesive layer 130, the first PET layer 141 disposed on the adhesive layer 130, the bonding layer 110 disposed on the first PET layer 141, the second PET layer 142 disposed on the bonding layer 110, and the hard coating layer 120 disposed on the second PET layer 142.

According to one embodiment of the present invention, the adhesive layer 130 may have a thickness of 5 to 15 micrometers, the first PET layer 141 may have a thickness of 10 to 20 micrometers, the bonding layer 110 may have a thickness of 5 to micrometers, the second PET layer 142 may have a thickness of 10 to 30 micrometers, and the hard coating layer 120 may have a thickness of 5 to 10 micrometers.

In regard to the characteristics such as securing visibility, the vehicle window film 100 according to one embodiment of the present invention may have a predetermined thickness for each layer constituting the vehicle window film 100 in order to secure the visibility for driver's safety and secure the sunlight blocking performance and heat blocking performance.

In regard to the predetermined thickness according to one embodiment of the present invention, the first PET layer 141 may have a thickness of 10 to 20 micrometers, the bonding layer 110 may have a thickness of 5 to 15 micrometers, the second PET layer 142 may have a thickness of 10 to 30 micrometers, and the hard coating layer 120 may have a thickness of 5 to 10 micrometers. In the above thickness range, the visibility to be secured when the vehicle window film 100 is attached to the car glass may be implemented, and simultaneously, the sun blocking performance and heat blocking performance of the vehicle window film 100 may be implemented.

In other words, the vehicle window film 100 according to one embodiment of the present invention may include the first PET layer 141, the bonding layer 110, the second PET layer 142 and the hard coating layer 120 having the predetermined thicknesses, so that the excellent visibility, sun blocking performance and heat blocking performance can be secured.

In one embodiment of the present invention, the first PET layer 141 and the second PET layer 142 may serve as a base layer of the vehicle window film 100. PET may ensure the excellent visibility due to excellent transmittance thereof. In addition, the two PET layers 141 and 142 may have the same structure as the bonding layer 110 therebetween, thereby adjusting the components of the bonding layer 110, so that the performance of the vehicle window film 100 can be adjusted.

According to one embodiment of the present invention, the bonding layer 110 may include a urethane resin, a curing agent, a UV blocking agent, an IR blocking agent and graphene. Preferably, the bonding layer 110 may include 0.1 to 5 parts by weight of a curing agent, 3 to 7 parts by weight of a UV blocking agent dispersion, 25 to 30 parts by weight of an IR blocking agent dispersion, 3 to 7 parts by weight of a graphene dispersion, and 90 to 100 parts by weight of a solvent based on 100 parts by weight of a urethane resin.

The vehicle window film 100 according to one embodiment of the present invention may include the UV blocking agent for blocking ultraviolet rays and the IR blocking agent for blocking infrared rays. Accordingly, the vehicle window film may serve to block ultraviolet and infrared rays in order to protect the driver's skin and suppress a rise of the temperature inside the vehicle. In one embodiment of the present invention, the UV blocking agent and the IR blocking agent are added to the bonding layer 110.

At this point, the IR blocking agent may include at least one of carbon, tungsten oxide (WO3) and ATO. Preferably, the IR blocking agent may include all of carbon, tungsten oxide (WO3) and ATO.

According to one embodiment of the present invention, the carbon is obtained by forming carbon (graphite) into very small particles of nanometer units, and may be dispersed in the bonding layer 110 to serve to block sunlight. To this end, the above carbon may mainly serve to block visible light, and the film may be coated with color according to the content. However, the carbon is in the form of dispersed particles unlike general dyes added for color, so the carbon may partially block sunlight in wavelength bands other than visible light.

Tungsten oxide (WO3) serves to block a wavelength band of 900 nm to 1500 nm. The above tungsten oxide (WO3) may be added in the form of mixing fine powder of nanometer units dispersed in a dispersion. The haze may vary according to the size of fine powder and the degree of dispersion in the above dispersion.

Haze refers to a phenomenon in which light is diffused other than being reflected or absorbed based on a material when the light passes through a transparent material, thereby exhibiting an opaque and cloudy appearance. The above haze is defined according to the dispersed degree of an incident light beam, and defined as fraction of light scattered at ±2.5° or more. Since the above haze may be a cause of obstruction of view in the window film 100 attached to the glass, the haze is required to be suppressed as much as possible.

ATO refers to an antimony-doped tin oxide (Antimony Tin Oxide) and serves to block a wavelength band of 1500 nm or more. Like tungsten oxide, ATO may be added and mixed in the form of fine powder dispersed in a dispersion. In addition, like tungsten oxide, the haze may vary according to the size of fine powder and the degree of dispersion in the dispersion.

According to one embodiment of the present invention, the IR blocking agent may further include ITO. ITO refers to indium tin oxide, and may block even shorter wavelengths compared to ATO, and exhibit a high blocking rate even at long wavelengths. In general, ITO has very transparent characteristic and rarely generates haze. However, ITO is not generally used because it is an expensive material compared to tungsten oxide or ATO.

When the bonding layer 110 is formed, the IR blocking agent according to one embodiment of the present invention may be added in the form of a dispersion dispersed in an organic solvent such as MEK, MIBK, PM, or TOL, and a dispersant may be added therein as needed.

The UV blocking agent may be used as a material generally used and having UV blocking performance.

Graphene refers to a carbon allotrope that is a material having a two-dimensional planar structure in which carbon atoms are connected as honeycomb-shaped hexagonal crystals and have a thickness of one atom. Graphene is a material having very high thermal conductivity. According to the present invention, graphene is contained in the bonding layer 110 containing the UV blocking agent and the IR blocking agent, so that heat generated by sunlight absorbed by the UV blocking agent and the IR blocking agent may be quickly dissipated. When the generated heat is not dissipated, a temperature locally rises to increase the heat dissipated into the vehicle, and accordingly, the thermal blocking effect of the window film may be deteriorated. Whereas, according to the present invention, the heat is quickly dissipated by graphene, thereby reducing the heat dissipated into the vehicle, so that the thermal blocking effect can be increased.

According to one embodiment of the present invention, the graphene may be mixed with the urethane resin and the solvent in the form of a graphene dispersion dispersed in a dispersion solvent, and the urethane resin mixed with the graphene dispersion may be mixed with the curing agent to bond the first PET layer to the second PET layer between the first PET layer and the second PET layer.

According to one embodiment of the present invention, the graphene dispersion may be formed by adding graphene to a dispersion solvent containing sulfuric acid and nitric acid and applying ultrasonic waves for 30 minutes to 3 hours. According to the present invention, graphene is added to a dispersion solvent containing 20 to 40 parts by weight of sulfuric acid based on 100 parts by weight of nitric acid, the dispersion solvent is applied with ultrasonic waves and then acid-treated, so that the graphene dispersion may be formed. This is a process of dividing graphene to have smaller sizes. The dispersion degree of graphene is significantly increased through the above processing, so that haze may be prevented from occurring when the bonding layer 110 is formed, and the heat dissipation effect of graphene may be improved.

It is preferable that the dispersion solvent may include 20 to 40 parts by weight of sulfuric acid based on 100 parts by weight of nitric acid. More preferably, it is effective to include 25 to 35 parts by weight of sulfuric acid based on 100 parts by weight of nitric acid. The size of graphene may be easily divided in the above dispersion solvent. When the above ratio deviates, the effects of preventing the occurrence of haze and improving the heat dissipation may be deteriorated.

In addition, the dispersion solvent having graphene added thereto is applied with ultrasonic waves and agitated, so that the graphene may be effectively cut. When the agitating time for applying ultrasonic waves is less than 30 minutes, the dispersibility may be deteriorated due to insufficient agitation. In the case of more than 3 hours, economic feasibility may be lowered, and the cut graphene may be entangled again, thereby lowering the acid-treated effect.

Meanwhile, according to one embodiment of the present invention, the IR blocking agent may be subject to a primary mixing process with the graphene dispersion while being in the form of an IR blocking agent dispersion dispersed in a dispersion solvent, and the mixed solution of the IR blocking agent dispersion and the graphene dispersion may be subjected to a secondary mixing process with the urethane resin and the solvent, thereby forming a bonding layer.

Preferably, in the primarily mixing process, the mixed solution of the IR blocking agent dispersion and the graphene dispersion may be dispersed and mixed by a shear force of a high shear mixer.

The high shear mixer, as an example, may include a device composed of two or more rotors and stators to generate a high shear force by using a high rotational force and the like. The above high shear mixer may make the mixed solution more homogeneous by using a cavitation phenomenon. Preferably, the high shear mixer may perform dispersion and mixing for 1 hour or more at a rotation speed of about 6,000 rpm or higher with respect to the mixed solution. At this point, cooling is additionally performed so as to maintain the temperature of the mixed solution at 10° C.

More preferably, in the secondarily mixing process, the mixed solution of the IR blocking agent dispersion and the graphene dispersion having been subject to the primarily mixing process is mixed with the urethane resin and the solvent, and agitated through a bead mill, and thus the dispersing and mixing may be performed. Preferably, the bead mill may have a bead mill form capable of nano-dispersion. The bonding solution formed by mixing the mixed solution, urethane resin and solvent may be more homogeneous and have improved dispersibility due to the beads by the agitation through the above bead mill.

As an example of the bead mill, the dispersing and milling may be conducted by applying an impact force to target powder by using efficient beads, for example, zirconia-containing beads, during wet dispersion and wet milling. Through the above bead mill, the bonding solution may be more homogeneous and have improved dispersibility by the beads.

In addition, the bead may preferably have a particle diameter of 50 μm to 200 μm. More preferably, beads having a particle size in the range of 80 μm to 120 μm may be used.

It is preferable that a rotating body of the bead mill may be used to have a rotation speed in the frequency range of about 30 Hz to about 60 Hz.

According to one embodiment of the present invention, after the IR blocking agent dispersion and the graphene dispersion, which have low-viscosity, are mixed first to facilitate dispersion, the urethane resin having high viscosity is mixed and agitated, so that the efficiency of agitation may be improved.

Accordingly, the curing agent is mixed with the bonding solution formed by mixing the IR blocking agent dispersion, the graphene dispersion, the urethane resin and the solvent, so that the bonding layer may be formed. According to the present invention, after the curing agent is added to the bonding solution, the curing agent is agitated during a pot life, applied onto an upper surface of the first PET layer 141, and disposed thereon with the second PET layer 142, so that the bonding layer may be formed.

Alternatively, in another embodiment of the present invention, the IR blocking agent may be subject to a primary mixing process with the urethane resin while being in the form of an IR blocking agent dispersion dispersed in a dispersion solvent, and subject to a secondary mixing process with the graphene dispersion in the bonding solution formed by mixing the IR blocking agent dispersion with the urethane resin, so that the bonding layer may be formed.

Meanwhile, according to one embodiment of the present invention, the hard coating layer 120 may include an acrylic resin and a photoinitiator. Preferably, the hard coating layer 120 may include 0.1 to 3 parts by weight of a photoinitiator and 140 to 160 parts by weight of a solvent based on 100 parts by weight of the acrylic resin.

According to one embodiment of the present invention, the hard coating layer 120 may be disposed on the second PET layer 142 serving as the base layer of the vehicle window film 100 to maintain the surface of the car glass. The vehicle window film according to one embodiment of the present invention may be manufactured in a manner of including the first PET layer 141 and the second PET layer 142 as the base layer, and conducting a hard coating on the upper surface of the second PET layer 142. The above hard coating may exhibit the performance of preventing scratches that may be generated on the surface of the car glass.

Meanwhile, in one embodiment of the invention, the adhesive layer 130 may include an acrylic copolymer, a curing agent, and a solvent. Preferably, the adhesive layer 130 according to one embodiment of the present invention may include 0.1 to 5 parts by weight of a curing agent and 90 to 110 parts by weight of a solvent based on 100 parts by weight of the acrylic copolymer. According to one embodiment of the present invention, a surface treatment process such as corona treatment and primer treatment may be performed on the surface of the first PET layer 141, so that the adhesion between the first PET layer 141 and the adhesive layer 130 disposed on a lower surface of the first PET layer 141 may be improved. However, in another embodiment of the present invention, the adhesive layer 130 may be configured with the above-described composition, so as to have a high bonding force between the adhesive layer 130 and the first PET layer 141 without the above separate surface treatment process.

In the components of the adhesive layer 130, the acrylic copolymer is a component capable of imparting the adhesive force of the adhesive layer 130, and the solvent is a component for uniformly mixing components constituting the adhesive layer 130. According to one embodiment of the present invention, the adhesive layer 130 may include a composition of 0.1 to 5 parts by weight of a curing agent and 90 to 110 parts by weight of a solvent based on 100 parts by weight of the acrylic copolymer so as to be suitable for improving the adhesion with the first PET layer 141. However, the components constituting the adhesive layer 130 may have variable characteristics expressed according to the composition thereof, and the characteristics may include viscosity, adhesion, and the like. According to the present invention, the adhesive layer 130 for improving the adhesion with the first PET layer 141 is formed through the above composition.

In addition, according to the present invention, the adhesion between the adhesive layer 130 and the first PET layer 141 is improved, so that a transfer phenomenon, in which the adhesive remains on the car glass upon removal of the vehicle window film 100, may be prevented. Preferably, the adhesion between the first PET layer 141 and the adhesive layer 130 is improved by the adhesive layer 130 of the vehicle window film 100, and accordingly, the unnecessary surface treatment process may not be performed on the surface of the first PET layer 141, so that the cost for the film can be lowered, and the transfer phenomenon, in which the adhesive remains on the car glass upon removal of the film, can be prevented.

In addition, the adhesive layer 130 may have a predetermined thickness. Preferably, the adhesive layer 130 may have a thickness of 5 to 15 micrometers. As the vehicle window film 100 includes the adhesive layer 130 having the above composition, the thickness is optimized and set based on the characteristics to improve the adhesion between the first PET layer 141 and the adhesive layer 130. In other words, the vehicle window film 100 according to one embodiment of the present invention includes the adhesive layer 130 having the predetermined thickness, thereby improving the adhesion between the first PET layer 141 and the adhesive layer 130, so as to ensure the adhesion for preventing the transfer phenomenon in which the adhesive remains on the car glass upon removal of the film.

Meanwhile, according to one embodiment of the present invention, the adhesive layer 130 may further include the IR blocking agent as described above. The IR blocking agent may include at least one of carbon, tungsten oxide (WO3) and ATO. Preferably, the IR blocking agent may include all of carbon, tungsten oxide (WO3) and ATO.

According to the present invention, each of the bonding layer 110 and the adhesive layer 130 includes the IR blocking agent so as to increase the blocking rate of infrared rays, and the IR blocking agent can suppress the occurrence of haze.

Meanwhile, as shown in FIG. 3, the vehicle window film 100 may further include a release film 200 disposed below the adhesive layer 130. In one embodiment of the invention, the release film 200 may be disposed below the adhesive layer 130 so as to protect the adhesive layer 130 until the vehicle window film 100 is attached to the car glass. In addition, it is preferable that the release film 200 may have a small peel-off force because the release film 200 is required to be easily removed by an installer upon attachment to the car glass. In one embodiment of the invention, the release film 200 may include any release film 200 having a small peel-off force that is rarely increased even when time elapses while being attached to the adhesive layer 130.

Accordingly, the vehicle window film 100 according to one embodiment of the present invention includes the bonding layer 110 containing the IR blocking agent, the UV blocking agent and the graphene, thereby absorbing sunlight in the ultraviolet and infrared regions, and quickly dispersing the accordingly generated heat through graphene, so that the driver's skin can be protected to prevent aging of the skin, and the effect of reducing heat inside the vehicle can be improved. In addition, the additives such as the IR blocking agent and graphene are dispersed by the acid treatment, the high shear mixer, the bead mill, and the like, thereby reducing the haze caused by the additives, so that the haze can be prevented from interfering with the vision.

Hereinafter, a plurality of Examples and a Comparative Example according to the present invention will be described. In addition, results on performing characteristic tests of the Examples and the Comparative example will be described in detail.

Example 1 the bonding layer 110 including 10 parts by weight of a carbon dispersion, 9 parts by weight of a tungsten oxide (WO3) dispersion, 9 parts by weight of an ATO dispersion, and 8 parts by weight of a graphene dispersion is formed on an upper surface of the first PET layer (141, 12 micrometers) to have a thickness of 6 micrometers, the second PET layer 142 and the hard coating layer 120 are formed on an upper surface of the bonding layer 110 to have thicknesses of 25 micrometers and 5 micrometers, respectively, and the an adhesive layer 130 including 100 parts by weight of an acrylic copolymer, 2 parts by weight of a curing agent, and 100 parts by weight of a solvent as a secondary coating is formed on a lower surface of the first PET layer 141 to have a thickness of 8 micrometers, so that the vehicle window film 100 is manufactured.

Example 2 the bonding layer 110 including 10 parts by weight of a carbon dispersion, 5 parts by weight of a tungsten oxide (WO3) dispersion, 5 parts by weight of an ATO dispersion, and 8 parts by weight of a graphene dispersion is formed on an upper surface of the first PET layer (141, 12 micrometers) to have a thickness of 6 micrometers, the second PET layer 142 and the hard coating layer 120 are formed on an upper surface of the bonding layer 110 to have thicknesses of 25 micrometers and 5 micrometers, respectively, and the an adhesive layer 130 including 100 parts by weight of an acrylic copolymer, 2 parts by weight of a curing agent, and 100 parts by weight of a solvent as a secondary coating is formed on a lower surface of the first PET layer 141 to have a thickness of 8 micrometers, so that the vehicle window film 100 is manufactured.

Example 3 the bonding layer 110 including 10 parts by weight of a carbon dispersion, 7 parts by weight of a tungsten oxide (WO3) dispersion, 7 parts by weight of an ATO dispersion, and 5 parts by weight of a graphene dispersion is formed on an upper surface of the first PET layer (141, 12 micrometers) to have a thickness of 6 micrometers, the second PET layer 142 and the hard coating layer 120 are formed on an upper surface of the bonding layer 110 to have thicknesses of 25 micrometers and 5 micrometers, respectively, and the an adhesive layer 130 including 100 parts by weight of an acrylic copolymer, 2 parts by weight of a curing agent, and 100 parts by weight of a solvent as a secondary coating is formed on a lower surface of the first PET layer 141 to have a thickness of 8 micrometers, so that the vehicle window film 100 is manufactured.

Example 4 the bonding layer 110 including 10 parts by weight of a carbon dispersion, 9 parts by weight of a tungsten oxide (WO3) dispersion, 9 parts by weight of an ATO dispersion, and 5 parts by weight of a graphene dispersion is formed on an upper surface of the first PET layer (141, 12 micrometers) to have a thickness of 6 micrometers, the second PET layer 142 and the hard coating layer 120 are formed on an upper surface of the bonding layer 110 to have thicknesses of 25 micrometers and 5 micrometers, respectively, and the an adhesive layer 130 including 100 parts by weight of an acrylic copolymer, 2 parts by weight of a curing agent, and 100 parts by weight of a solvent as a secondary coating is formed on a lower surface of the first PET layer 141 to have a thickness of 8 micrometers, so that the vehicle window film 100 is manufactured.

Example 5 the bonding layer 110 including 10 parts by weight of a carbon dispersion, 5 parts by weight of a tungsten oxide (WO3) dispersion, 5 parts by weight of an ATO dispersion, and 5 parts by weight of a graphene dispersion is formed on an upper surface of the first PET layer (141, 12 micrometers) to have a thickness of 6 micrometers, the second PET layer 142 and the hard coating layer 120 are formed on an upper surface of the bonding layer 110 to have thicknesses of 25 micrometers and 5 micrometers, respectively, and the an adhesive layer 130 including 100 parts by weight of an acrylic copolymer, 2 parts by weight of a curing agent, and 100 parts by weight of a solvent as a secondary coating is formed on a lower surface of the first PET layer 141 to have a thickness of 8 micrometers, so that the vehicle window film 100 is manufactured.

Example 6 the bonding layer 110 including 10 parts by weight of a carbon dispersion, 7 parts by weight of a tungsten oxide (WO3) dispersion, 7 parts by weight of an ATO dispersion, and 3 parts by weight of a graphene dispersion is formed on an upper surface of the first PET layer (141, 12 micrometers) to have a thickness of 6 micrometers, the second PET layer 142 and the hard coating layer 120 are formed on an upper surface of the bonding layer 110 to have thicknesses of 25 micrometers and 5 micrometers, respectively, and the an adhesive layer 130 including 100 parts by weight of an acrylic copolymer, 2 parts by weight of a curing agent, and 100 parts by weight of a solvent as a secondary coating is formed on a lower surface of the first PET layer 141 to have a thickness of 8 micrometers, so that the vehicle window film 100 is manufactured.

Comparative Example

As a conventional vehicle window film product of STEK company, the bonding layer 110 including 10 parts by weight of a carbon dispersion, 9 parts by weight of a tungsten oxide (WO3) dispersion, and 9 parts by weight of an ATO dispersion is formed on an upper surface of the first PET layer (141, 12 micrometers) to have a thickness of 6 micrometers, the second PET layer 142 and the hard coating layer 120 are formed on an upper surface of the bonding layer 110 to have thicknesses of micrometers and 5 micrometers, respectively, and the adhesive layer 130 including 100 parts by weight of an acrylic copolymer, 2 parts by weight of a curing agent, and 100 parts by weight of a solvent is formed as a secondary coating on the lower surface of the first PET layer 141 to have a thickness of 8 micrometers.

Contents of carbon, tungsten oxide, ATO and graphene of the Examples and Comparative Example as described above will be summarized in Table 1 below.

TABLE 1

| Window film | Carbon dispersion | WO3 dispersion | ATO dispersion | Graphene dispersion |
|---|---|---|---|---|
| Example 1 | 10 | 9 | 9 | 8 |
| Example 2 | 10 | 5 | 5 | 8 |
| Example 3 | 10 | 7 | 7 | 5 |
| Example 4 | 10 | 9 | 9 | 5 |
| Example 5 | 10 | 5 | 5 | 5 |
| Example 6 | 10 | 7 | 7 | 3 |
| Comparative Example | 10 | 9 | 9 | — |

Results on Window Film Characteristics Comparison Experiments

Table 2 shows the results of measuring the blocking rates in the visible, ultraviolet and infrared regions of Examples 1 to 6 and Comparative Example according to the present invention.

TABLE 2

| Window film | VLT | UVR | IRR 900~1,000 nm | IRR 1,400 nm |
|---|---|---|---|---|
| Example 1 | 14.80% | 99.90% | 95.60% | 95.10% |
| Example 2 | 14.40% | 99.90% | 93.80% | 94.10% |
| Example 3 | 15.20% | 99.90% | 95.00% | 95.20% |
| Example 4 | 14.90% | 99.90% | 95.50% | 95.50% |
| Example 5 | 15.80% | 99.90% | 93.60% | 93.70% |
| Example 6 | 14.10% | 99.90% | 95.10% | 94.90% |
| Comparative Example | 15.30% | 99.90% | 94.90% | 95.00% |

As shown in Table 2, all of the Examples of the present invention and the Comparative Example have the same carbon content, thereby exhibiting almost similar visible light blocking rate of about 15%.

In addition, all of the Examples of the present invention and the Comparative Example exhibit the same UV blocking rate of 99.9% due to the UV blocking agent.

On the other hand, there is a slight difference in the infrared region according to contents of WO3 and ATO, however, a high blocking rate of 90% or higher is basically exhibited, and there is no significant difference according to the content of graphene. In other words, since graphene is added not for the purpose of blocking infrared rays but for dissipating heat, there is no difference in the blocking of infrared rays itself according to the content of graphene.

Figure 4:
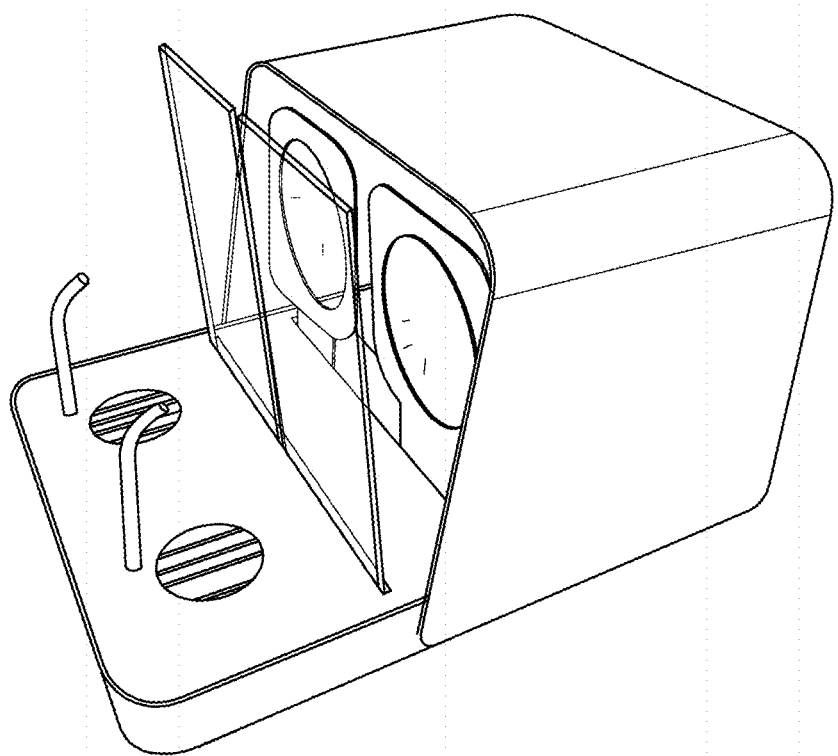
FIG. 4 shows an example of a tester for measuring thermal blocking effects of the Examples and the Comparative Example of the vehicle window film according to one embodiment of the present invention.

FIG. 4 shows an example of a tester for measuring thermal blocking effects of the Examples and Comparative Example of the vehicle window film according to one embodiment of the present invention. The thermal blocking effect tester shown in FIG. 4 measures an initial temperature through a thermal imaging camera after the window film is installed on an infrared lamp, and then measures the temperature in a preset time after the infrared lamp is activated, thereby measuring temperature changes. It can be determined that the heat blocking effect of the corresponding window film is excellent when the temperature is changed slightly.

Table 3 shows temperature change values measured through the heat blocking effect tests of Examples 1 to 6 according to the present invention, and the Comparative Example that are measured with the tester shown in FIG. 4. FIG. 5 schematically shows results on the heat blocking effect test of the Examples and Comparative Example of the vehicle window film 100 according to one embodiment of the present invention.

TABLE 3

| Window film | Temperature change (ΔT, ° C.) |
|---|---|
| Example 1 | 4.1 |
| Example 2 | 5.8 |
| Example 3 | 4.1 |
| Example 4 | 4.0 |
| Example 5 | 5.9 |
| Example 6 | 5.0 |
| Comparative Example | 5.1 |

Figure 5A:
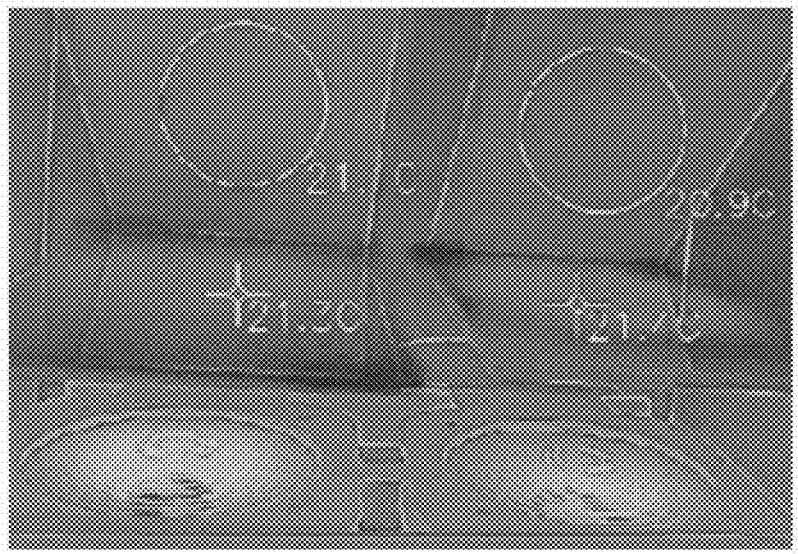
FIGS. 5A and 5B schematically show results on the heat blocking effect tests of Examples and Comparative Example of the vehicle window film according to one embodiment of the present invention.
Figure 5B:
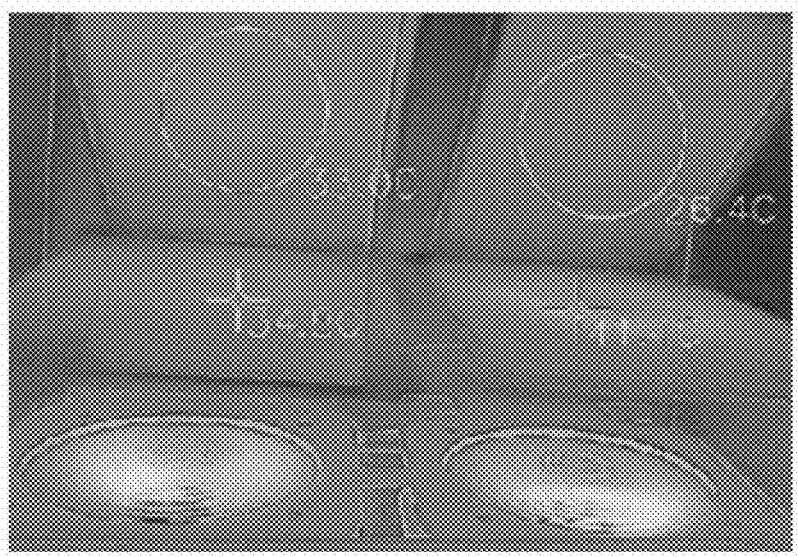

As shown in Table 2, the temperature change of Example 1 is 4.1° C., the temperature change of Example 2 is 5.8° C., the temperature change of Example 3 is 4.1° C., the temperature change of Example 4 is 4.0° C., the temperature change of Example 5 is 5.9° C., the temperature change of Example 6 is 5.0° C., and the temperature change of the Comparative Example is 5.1° C. FIG. 5 shows states of the temperature changes confirmed through the thermal imaging camera. FIG. 5A is the initial temperature before activating the infrared lamp, and FIG. 5B shows the changed temperature after activating the infrared lamp.

Examples 1, 3 and 4 show temperature changes of about 4° C. lower than those of the other Examples and Comparative Example. Whereas, Examples 2 and 5 exhibit a temperature change of almost 6° C., and Example 6 and Comparative Example exhibit a temperature change of about 5° C.

Based on the analysis of the above results, Example 1 has high contents of the IR blocking agent (tungsten oxide and ATO) and the graphene, thereby exhibiting the very high thermal blocking effect, Example 3 exhibits the very high heat blocking effect even with the medium contents of the IR blocking agent and the graphene, and Example 4 exhibits the very high thermal blocking effect with the high IR blocking agent content and the medium graphene content.

Meanwhile, Example 2 exhibits the very low thermal blocking effect due to the low IR blocking agent content despite the high graphene content, and Example 5 exhibits the very low thermal blocking effect at the medium graphene content due to the low IR blocking agent content.

In addition, Example 6 has a medium IR blocking agent content similar to Example 3 but exhibits an approximately medium heat blocking effect because of poor heat dissipation due to the low graphene content, and Comparative Example has a high IR blocking agent content but does not contain graphene, thereby only exhibiting an approximately medium heat blocking effect.

In other words, it can be seen that, when the medium or higher IR blocking agent content and the medium or higher graphene content are provided, the high thermal blocking effect is exhibited, and when any of the IR blocking agent or graphene has a low content, the heat blocking efficiency is unfavorable.

In particular, based on the comparison between Examples 1 and 2, Example 2 exhibits a very low thermal blocking effect compared to Example 1 even with the same graphene content. When comparing Example 2 with Example 5, there is no significant difference in the thermal blocking effect though Example 2 has a higher graphene content than Example 1 at the same IR blocking agent content.

Whereas, based on the comparison between Example 3 and Example 6, Example 3 and Example 6 have the same IR blocking agent content, but there is a difference in the thermal blocking effect due to the difference in the graphene content.

In other words, it can be seen that graphene has almost no function to directly absorb and block sunlight, and serves to improve the thermal blocking performance by dispersing the heat generated due to sunlight absorbed by the IR blocking agent.

Figure 6:
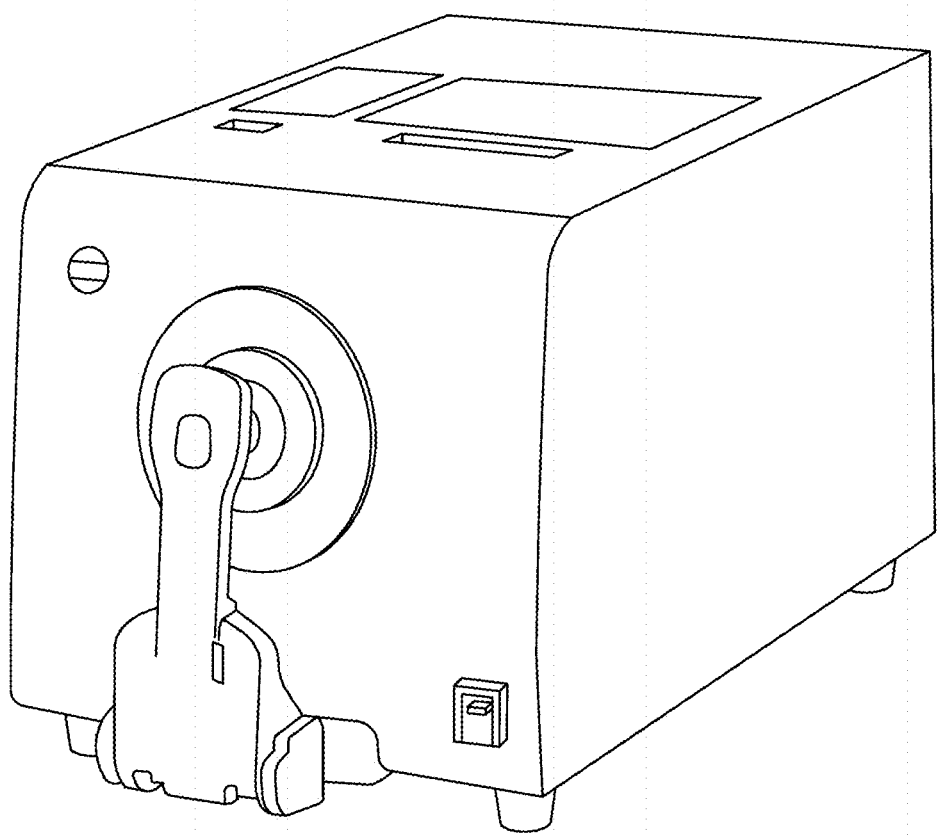
FIG. 6 shows one example of a tester for measuring the occurrence of haze of Examples and Comparative Examples of the vehicle window film according to one embodiment of the present invention.

FIG. 6 shows an example of a tester for measuring the occurrence of haze of Examples and Comparative Example of the vehicle window film according to one embodiment of the present invention. Herein, the haze generation of the vehicle window film 100 is measured by using a spectrophotometer of Minolta Company shown in FIG. 6.

Figures 7A, 7B, 7C:
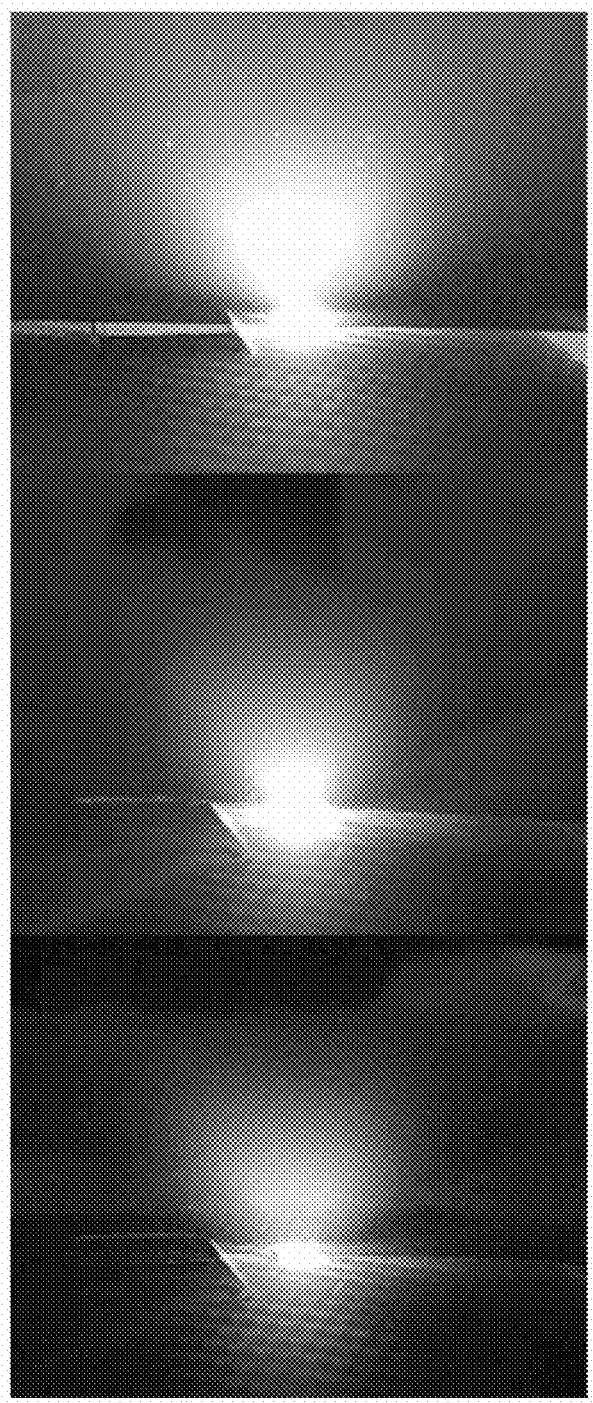
FIGS. 7A, 7B and 7C schematically show images of the haze occurrence tests of the Examples and Comparative Example of the vehicle window film according to one embodiment of the present invention.

Table 4 shows measurement results on the haze generation of Examples 1 to 6 and Comparative Example according to the present invention measured by the tester shown in FIG. 6. FIG. 7 schematically shows measurement images of the haze generation of the Examples and Comparative Example of the vehicle window film 100 according to one embodiment of the present invention. FIG. 7A is a measurement image of haze generation of Example 1, FIG. 7B is a measurement image of haze generation of Example 3, and FIG. 7C is a measurement image of haze generation of the Comparative Example.

TABLE 4

| Window film | Haze (%) |
| --- | --- |
| Example 1 | 3.00 |
| Example 2 | 2.69 |
| Example 3 | 0.94 |
| Example 4 | 2.70 |
| Example 5 | 0.90 |
| Example 6 | 1.05 |
| Comparative Example | 1.00 |

As shown in Table 4, the high haze generation of 2.5 to 3% is measured in Examples 1, 2 and 4, and the low haze generation of about 1% is measured in Example 3, Example 5, Example 6 and Comparative Example.

In comparison with the contents in Table 1, Example 1 shows that the haze is generated due to the high IR blocking agent content and the high graphene content, Example 2 shows that the haze is generated due to the low IR blocking agent content but the high graphene content, and Example 4 shows that the haze is generated due to the high ceramic content and the medium graphene content.

In particular, when comparing Example 4 with Comparative Example it can be seen that haze is generated due to the addition of graphene despite the same IR blocking agent content. In addition, when comparing Example 4 with Examples 3 and 5, it can be seen that the occurrence of haze varies depending on the IR blocking agent content even at the same graphene content. In other words, it can be seen that the occurrence of haze is not determined by the IR blocking agent content alone or the graphene content alone, but determined by a complex action of the contents of IR blocking agent and graphene.

Based on the above results, in the vehicle window film according to the present invention, it is determined to have the contents of IR blocking agent (WO3, ATO) and graphene as in Example 3 that can exhibit the optimal heat blocking effect without haze.

According to one embodiment of the present invention, the vehicle window film may be provided, so that the high transmittance of visible light can be implemented while sunlight in the ultraviolet and infrared regions can be blocked.

According to one embodiment of the present invention, the electromagnetic waves may be prevented from being reflected, so that sunlight in the ultraviolet and infrared regions can be blocked without interfering with radio waves of electronic devices such as navigation systems, Hi-passes, and smartphones inside the vehicle.

According to one embodiment of the present invention, the high thermal blocking effect can be exhibited by quickly dissipating the heat through graphene.

According to one embodiment of the present invention, the contents of IR blocking agent and graphene may be adjusted, so that the high thermal blocking effect can be exhibited without generating haze on the vehicle window film.

According to one embodiment of the present invention, graphene may be acid-treated to form a dispersion, so that the occurrence of haze can be inhibited.

According to one embodiment of the present invention, the bonding layer may be dispersed and mixed by the high shear mixer during forming the bonding layer, so that the occurrence of haze can be inhibited.

According to one embodiment of the present invention, the bonding layer may be dispersed and mixed by agitation through the bead mill during forming the bonding layer, so that the occurrence of haze can be inhibited. The descriptions of the described embodiments are provided to enable any person having ordinary skill in the art to use or execute the present invention. It will be apparent to the person having ordinary skill in the art that various modifications are available for the embodiments, and general principles defined herein may be applied to other embodiments without departing from the scope of the present invention. Accordingly, the present invention should not be limited to the embodiments set forth herein but should be construed in the broadest scope consistent with the principles and novel features set forth herein.

What is claimed is:

1. A vehicle window film comprising:
    an adhesive layer including an acrylic copolymer, a curing agent, and a solvent;
    a first PET layer disposed on the adhesive layer and including polyethylene terephthalate;
    a bonding layer disposed on the first PET layer and including a urethane resin, a curing agent, a UV blocking agent, an IR blocking agent, and graphene;
    a second PET layer disposed on the bonding layer and including polyethylene terephthalate; and
    a hard coating layer disposed on the second PET layer and including an acrylic resin and a photoinitiator, wherein the IR blocking agent includes carbon, tungsten oxide (WO3) and ATO.

2. The vehicle window film of claim 1, wherein the bonding layer includes 0.1 to 5 parts by weight of a curing agent, 3 to 7 parts by weight of a UV blocking agent dispersion, 25 to 30 parts by weight of an IR blocking agent dispersion, 3 to 7 parts by weight of a graphene dispersion, and 90 to 100 parts by weight of a solvent based on 100 parts by weight of the urethane resin.

3. The vehicle window film of claim 1, wherein the graphene is mixed with the urethane resin and the solvent in a form of a graphene dispersion dispersed in a dispersion solvent, and the urethane resin mixed with the graphene dispersion is mixed with the curing agent to bond the first PET layer to the second PET layer between the first PET layer and the second PET layer.

4. The vehicle window film of claim 3, wherein the graphene dispersion is formed by adding graphene to a dispersion solvent containing sulfuric acid and nitric acid and applying ultrasonic waves to the graphene dispersion for 30 minutes to 3 hours.

5. The vehicle window film of claim 3, wherein the IR blocking agent is subject to a primary mixing process with the graphene dispersion while being in the form of an IR blocking agent dispersion dispersed in a dispersion solvent, the mixed solution of the IR blocking agent dispersion and the graphene dispersion is subjected to a secondary mixing process with the urethane resin and the solvent, so as to form the bonding layer.

6. The vehicle window film of claim 5, wherein the primarily mixing process includes dispersing and mixing the mixed solution of the IR blocking agent dispersion and the graphene dispersion by a shear force of a high shear mixer.

7. The vehicle window film of claim 5, wherein the secondarily mixing process includes dispersing and mixing the mixed solution of the IR blocking agent dispersion and the graphene dispersion having been subject to the primarily mixing process by mixing the mixed solution with the urethane resin and the solvent, and agitating through a bead mill.

8. The vehicle window film of claim 1, wherein the adhesive layer includes 0.1 to 5 parts by weight of a curing agent and 90 to 110 parts by weight of a solvent based on 100 parts by weight of the acrylic copolymer.

9. The vehicle window film of claim 1, wherein the hard coating layer includes 0.1 to 3 parts by weight of a photoinitiator and 140 to 160 parts by weight of a solvent based on 100 parts by weight of the acrylic resin.

10. The vehicle window film of claim 1, wherein the adhesive layer has a thickness of 5 to 15 micrometers, the first PET layer has a thickness of 10 to 20 micrometers, the bonding layer has a thickness of 5 to 15 micrometers, the second PET layer has a thickness of 10 to 30 micrometers, and the hard coating layer has a thickness of 5 to 10 micrometers.

* * * * *